United States Patent
Watanabe et al.

(10) Patent No.: US 9,927,646 B2
(45) Date of Patent: Mar. 27, 2018

(54) DISPLAY DEVICE HAVING AN ADHESIVE LAYER

(71) Applicant: Japan Display Inc., Tokyo (JP)

(72) Inventors: Yoshihiro Watanabe, Tokyo (JP); Masanobu Ikeda, Tokyo (JP); Hayato Kurasawa, Tokyo (JP); Koji Ishizaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 273 days.

(21) Appl. No.: 14/798,727

(22) Filed: Jul. 14, 2015

(65) Prior Publication Data
US 2016/0011448 A1     Jan. 14, 2016

(30) Foreign Application Priority Data
Jul. 14, 2014  (JP) .................. 2014-143832

(51) Int. Cl.
| | |
|---|---|
| *G06F 3/045* | (2006.01) |
| *G02F 1/1333* | (2006.01) |
| *G02F 1/1335* | (2006.01) |
| *G06F 3/041* | (2006.01) |
| *G06F 3/044* | (2006.01) |

(52) U.S. Cl.
CPC .... *G02F 1/13338* (2013.01); *G02F 1/133528* (2013.01); *G06F 3/044* (2013.01); *G06F 3/0412* (2013.01); *G06F 2203/04101* (2013.01); *G06F 2203/04112* (2013.01)

(58) Field of Classification Search
CPC ........... G06F 1/13338; G06F 1/133528; G06F 3/0412; G06F 3/044; G06F 2203/04101; G06F 2203/04112
See application file for complete search history.

(56) References Cited

U.S. PATENT DOCUMENTS

| | | | |
|---|---|---|---|
| 2010/0295819 A1* | 11/2010 | Ozeki | G06F 3/044 |
| | | | 345/174 |
| 2013/0002569 A1 | 1/2013 | Kang et al. | |
| 2014/0146000 A1* | 5/2014 | Jo | G06F 3/044 |
| | | | 345/174 |

(Continued)

FOREIGN PATENT DOCUMENTS

| | | |
|---|---|---|
| CN | 102467276 | 5/2012 |
| CN | 102736777 | 10/2012 |
| JP | 07-028598 | 1/1995 |

(Continued)

OTHER PUBLICATIONS

Chinese Office Action for related Chinese Application No. 2015104118384; dated Dec. 19, 2017; (17 pages).

*Primary Examiner* — Peter D McLoone
(74) *Attorney, Agent, or Firm* — K&L Gates LLP

(57) ABSTRACT

According to one embodiment, a display device comprises a display panel, a metal layer, a coat layer, a cover member and an adhesive layer. The display panel comprises a principal surface including a display area in which an image is displayed. The metal layer is provided on the principal surface. The coat layer covers the metal layer and is in contact with the principal surface. The cover member faces the coat layer. The adhesive layer bonds the cover member to the coat layer and continuously covers the principal surface and at least a part of an outer edge of the coat layer.

20 Claims, 12 Drawing Sheets

(56) References Cited

U.S. PATENT DOCUMENTS

2015/0062460 A1\* 3/2015 Yamada ................. G06F 3/041
　　　　　　　　　　　　　　　　　　　349/12
2015/0103262 A1\* 4/2015 Song ...................... B32B 37/06
　　　　　　　　　　　　　　　　　　　349/12

FOREIGN PATENT DOCUMENTS

| JP | 2013-016141 | 1/2013 |
| WO | 2013172000 | 11/2013 |

\* cited by examiner

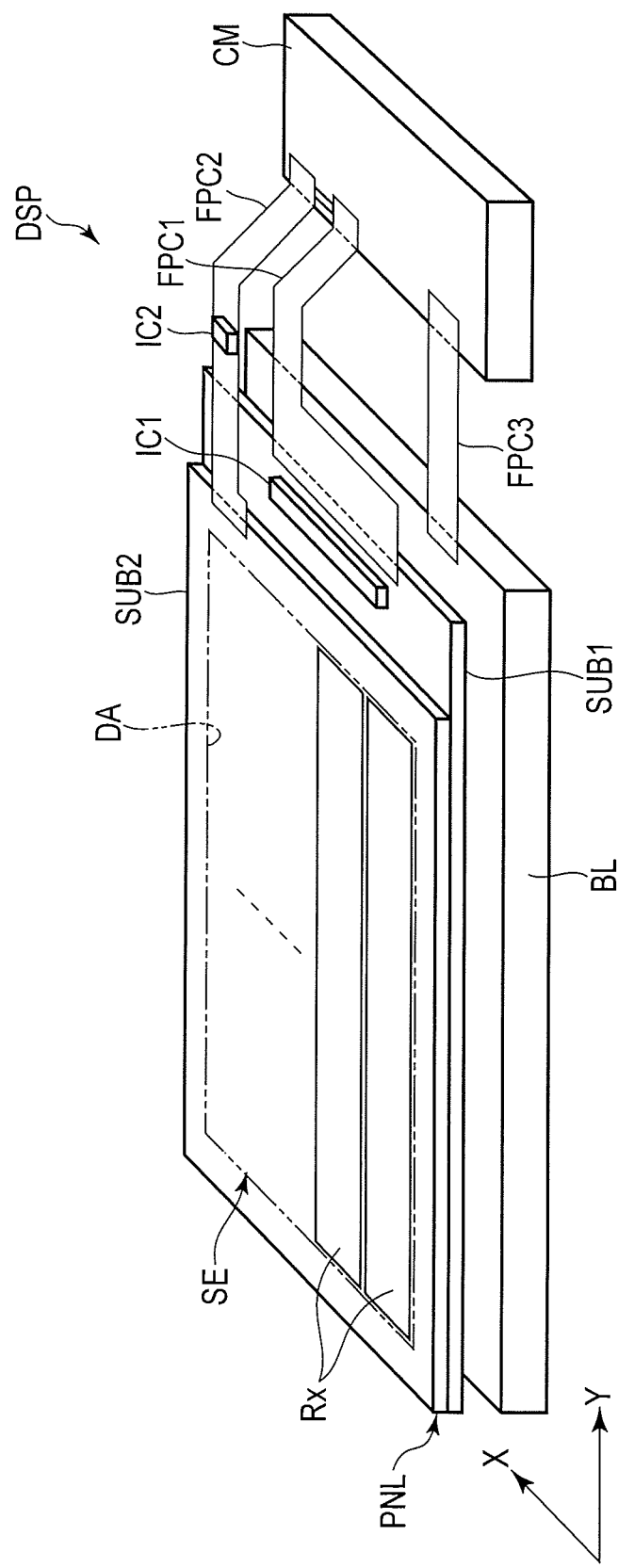
F I G. 1

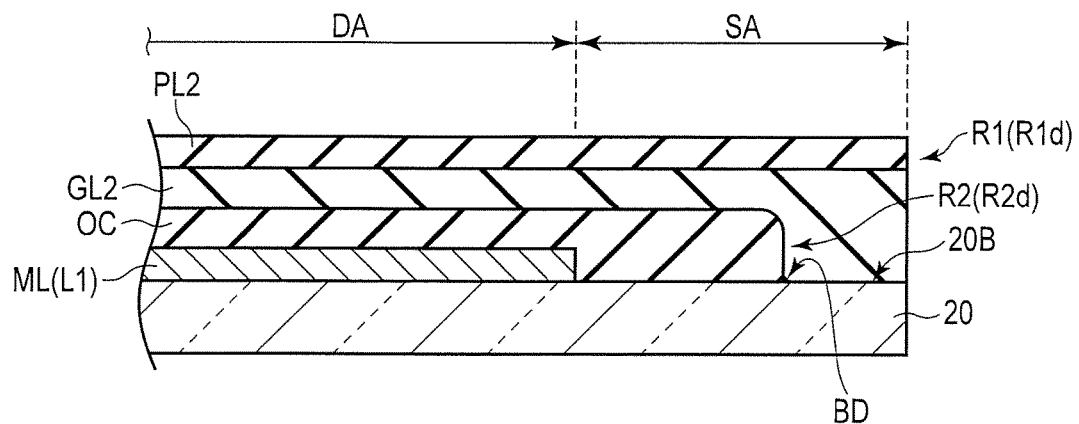
F I G. 5
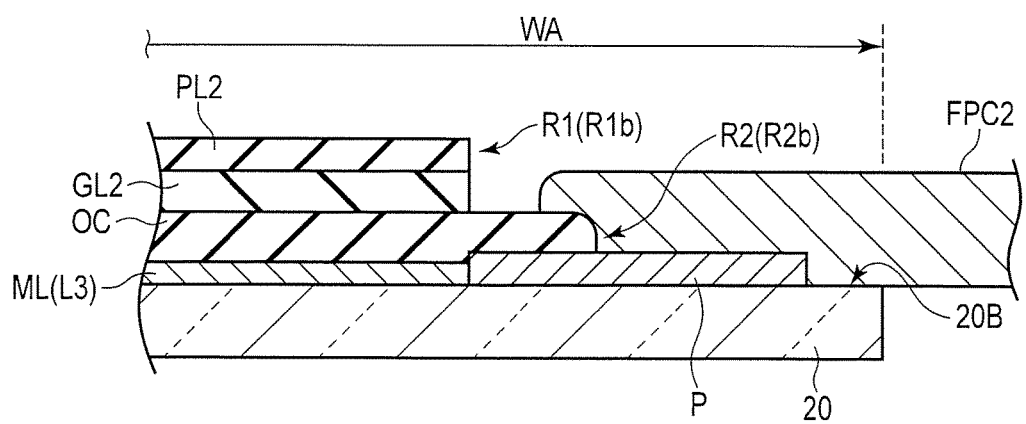
F I G. 6

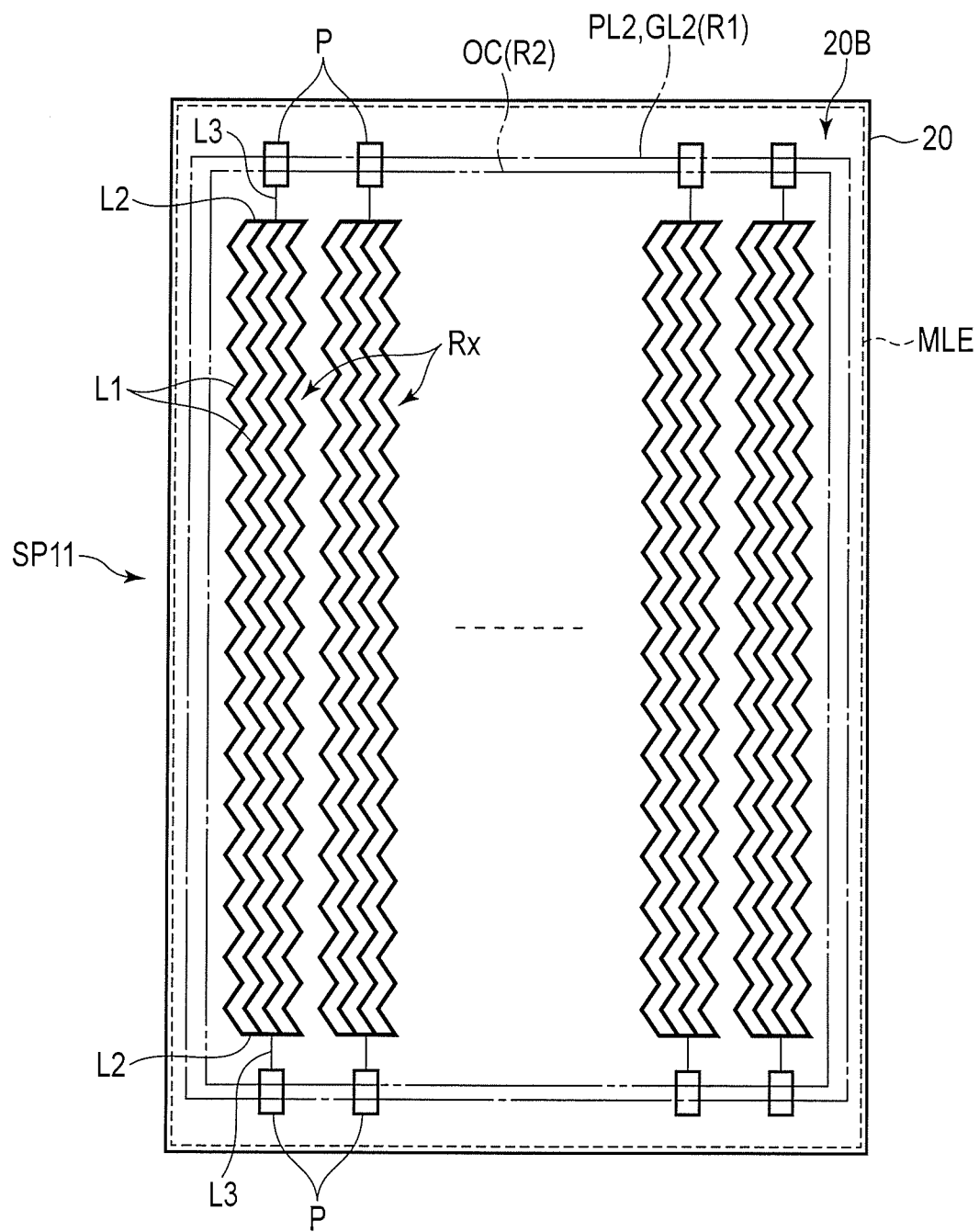
F I G. 7

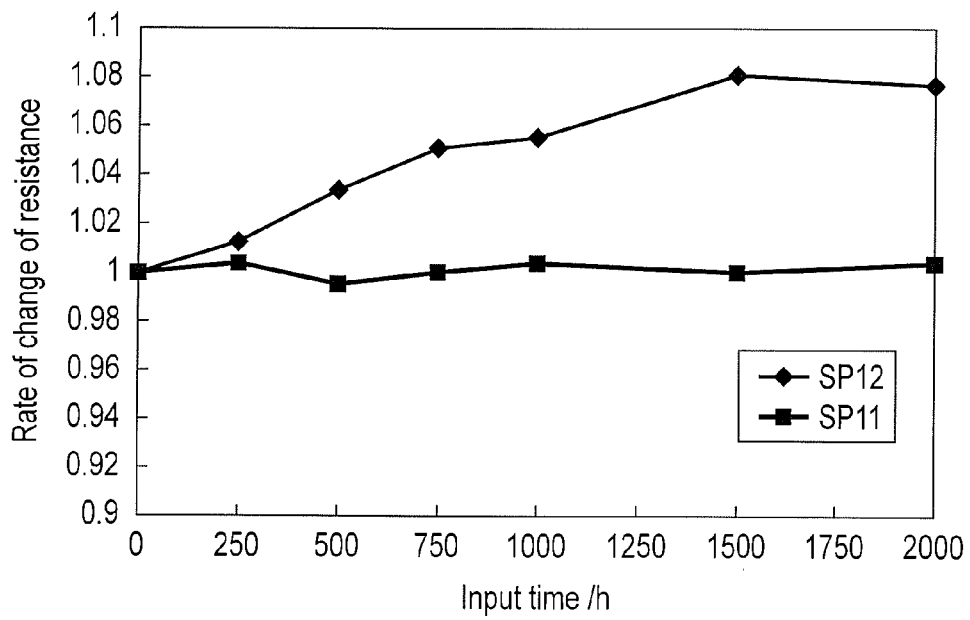
F I G. 10
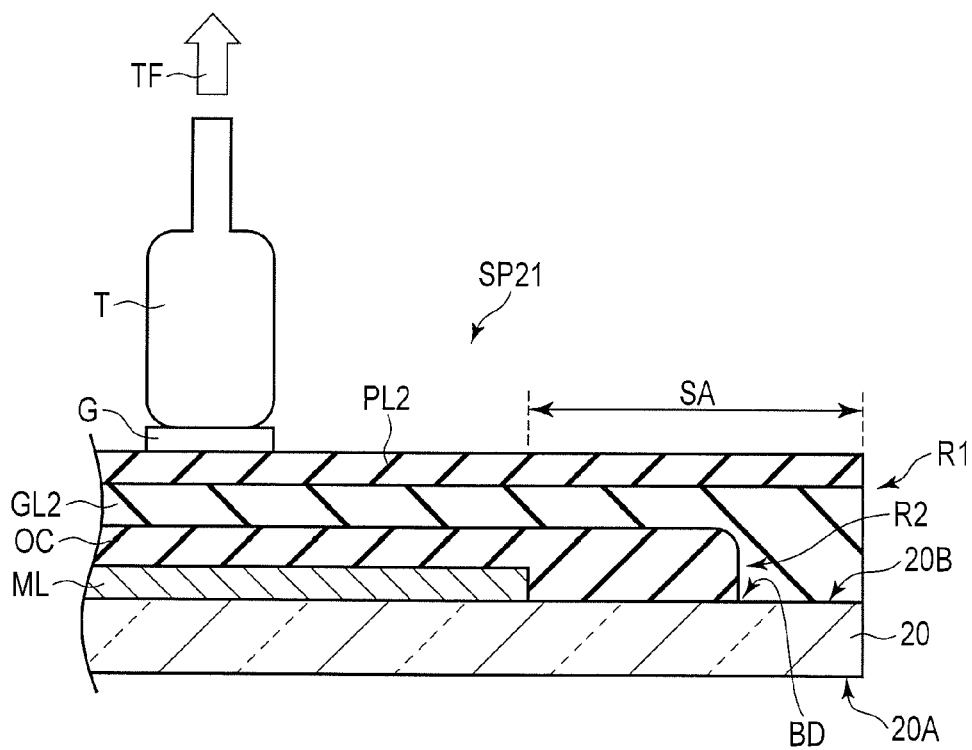
F I G. 11

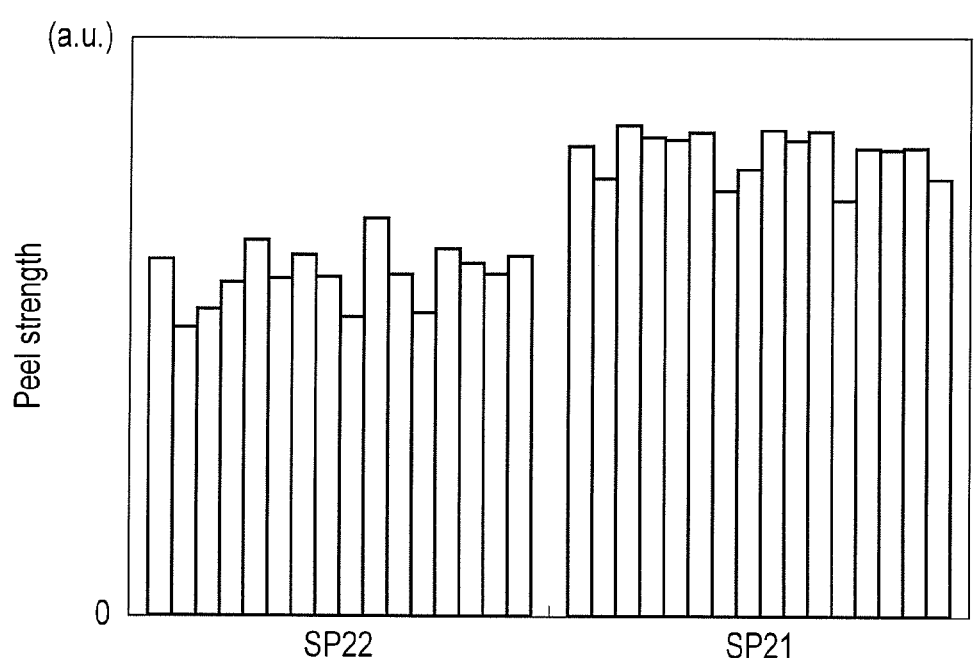
F I G. 12

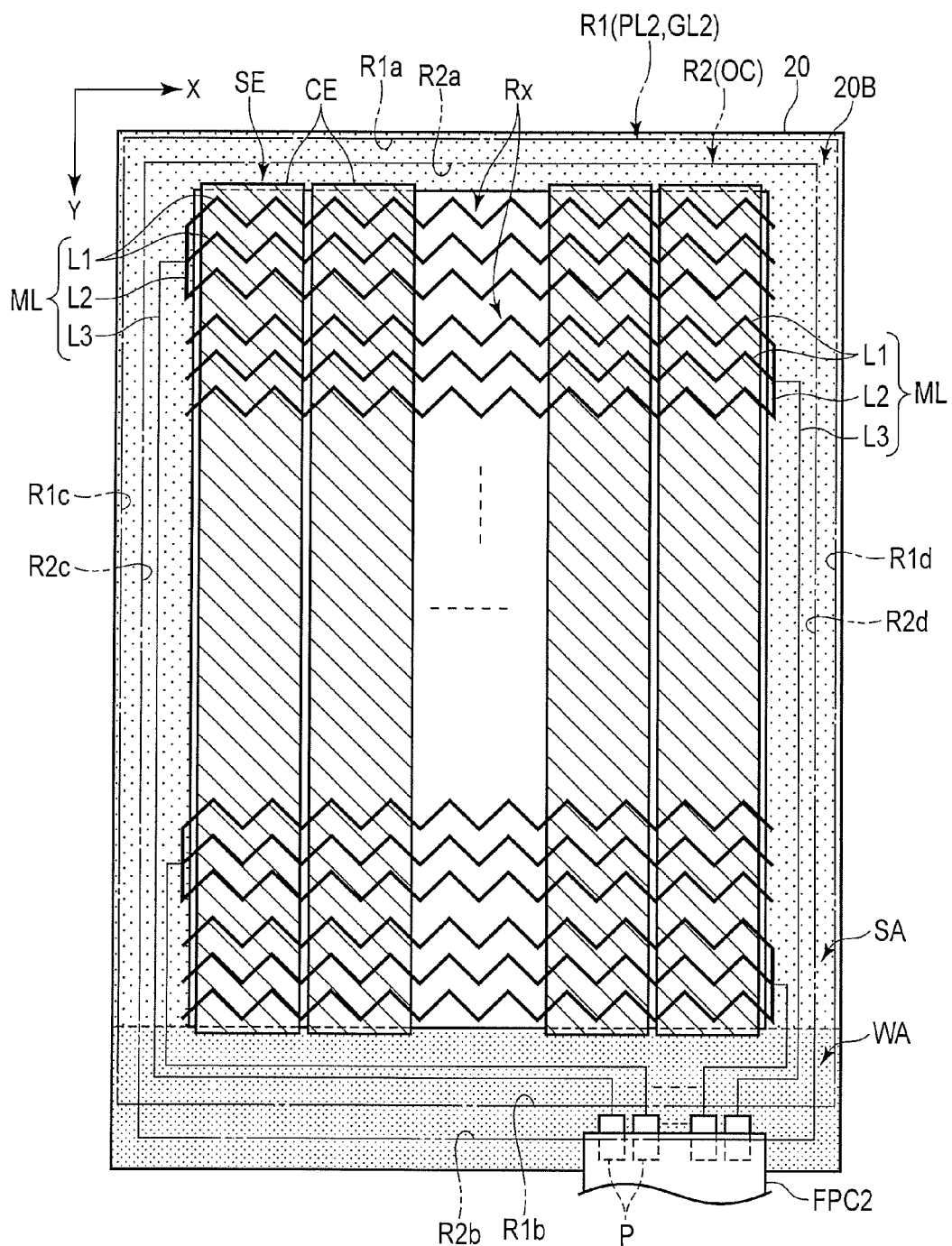
F I G. 13

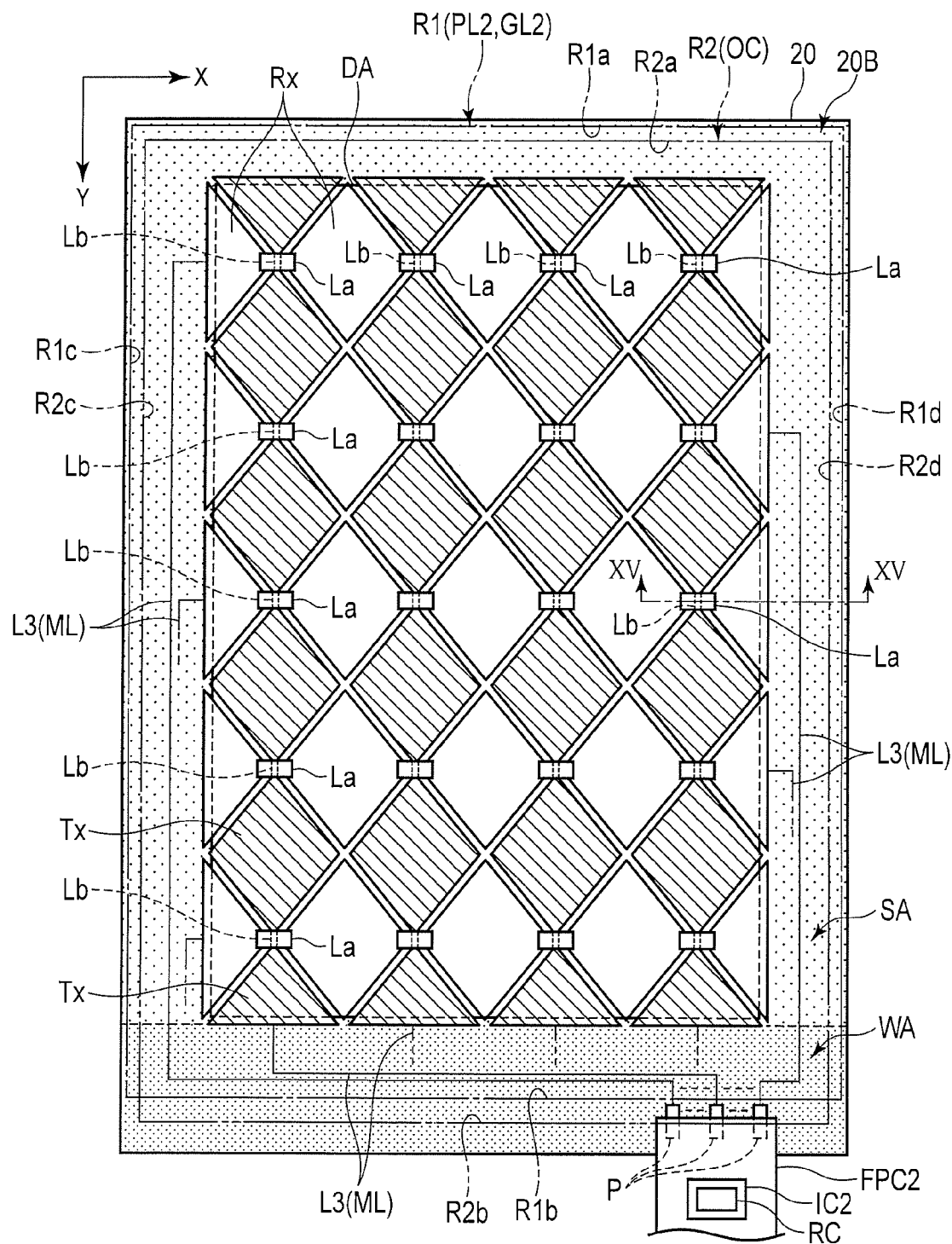
F I G. 14

DISPLAY DEVICE HAVING AN ADHESIVE LAYER

CROSS REFERENCES TO RELATED APPLICATIONS

The present application claims priority to Japanese Priority Patent Application JP 2014-143832 filed in the Japan Patent Office on Jul. 14, 2014, the entire content of which is hereby incorporated by reference.

FIELD

Embodiments described herein relate generally to a display device.

BACKGROUND

A display device with a sensor which detects an object touching or approaching a display area is used. The sensor is often called a touchpanel.

In this kind of display device, technology to form a sensing pattern of a transparent conductive material on a substrate and form leads connected to the sensing pattern of a low-resistance metal material on the substrate is proposed.

The metal material is more likely to corrode by water than the transparent conductive material, etc. Therefore, when the metal material such as leads is provided on the substrate, corrosion of the metal material by water needs to be inhibited.

SUMMARY

This application relates generally to a display device.

In an embodiment, a display device is provided. A display device comprising a display panel comprising a principal surface including a display area in which an image is displayed; a metal layer provided on the principal surface; a coat layer covering the metal layer and in contact with the principal surface; a cover member facing the coat layer; an adhesive layer bonding the cover member to the coat layer and continuously covering the principal surface and at least a part of an outer edge of the coat layer.

Additional features and advantages are described herein, and will be apparent from the following Detailed Description and the figures.

BRIEF DESCRIPTION OF THE FIGURES

FIG. 1 is a perspective view schematically showing a structure of a display device of a first embodiment.

FIG. 5 is a view schematically showing an example of a cross-section seen along V-V in FIG. 4.

FIG. 6 is a view schematically showing an example of a cross-section seen along VI-VI in FIG. 4.

FIG. 7 is an illustration of a schematic structure of a first sample used in experiment I.

FIG. 10 is a graph showing a measurement result of experiment I.

FIG. 11 is an illustration of a schematic structure of a first sample used in experiment II and an experimental method.

FIG. 12 is a graph showing a measurement result of experiment II.

FIG. 13 is a plan view schematically showing an example of elements provided on a principal surface of the display panel in a second embodiment.

FIG. 14 is a plan view schematically showing an example of elements provided on a principal surface of the display panel in a third embodiment.

DETAILED DESCRIPTION

Figure 2:
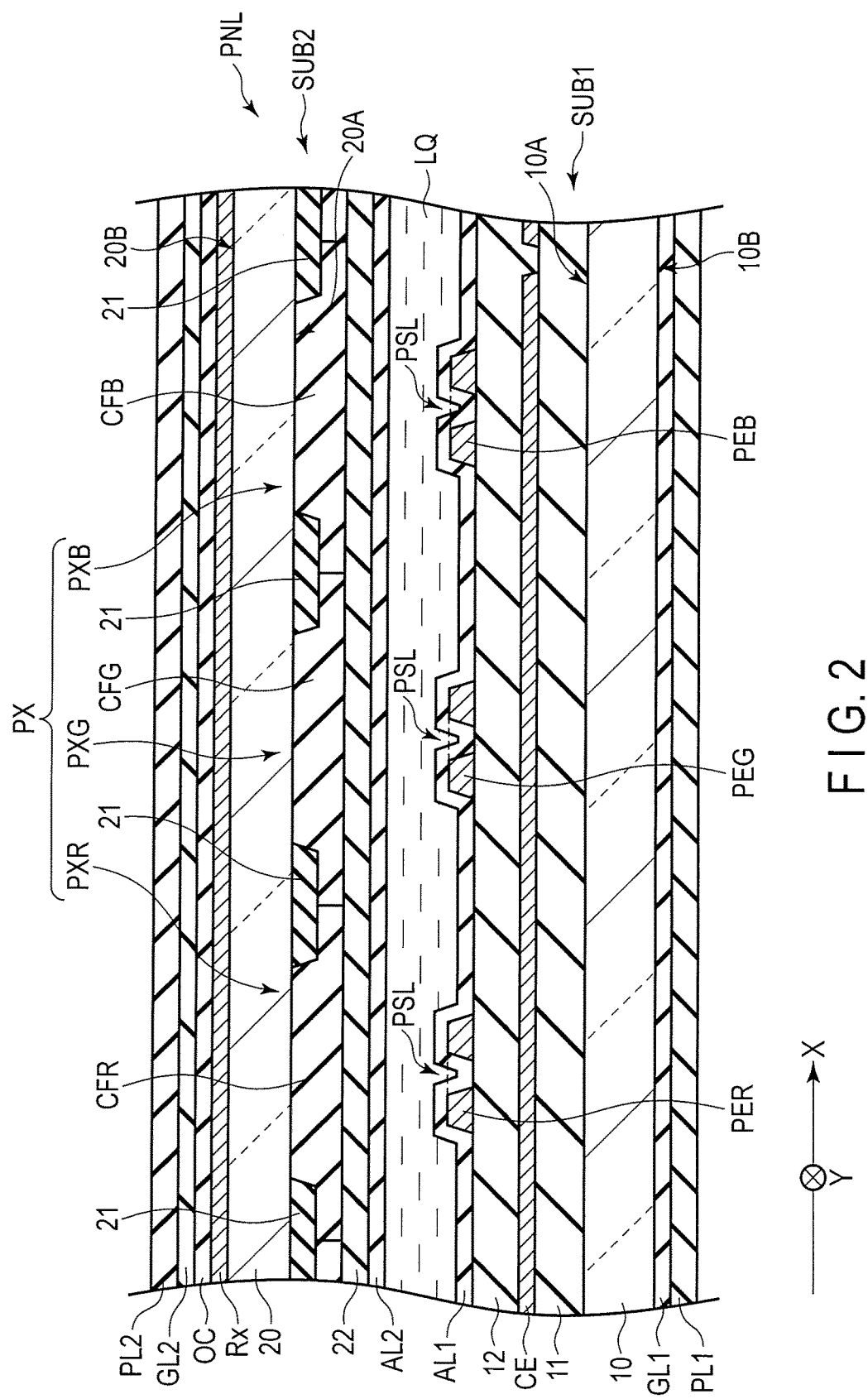
FIG. 2 is a cross-sectional view schematically showing a structural example of a liquid crystal display panel comprised in the display device and elements provided on a principal surface of the panel.

Various embodiments will be described hereinafter with reference to the accompanying drawings.

In general, according to one embodiment, a display device comprises a display panel, a metal layer, a coat layer, a cover member and an adhesive layer. The display panel comprises a principal surface including a display area in which an image is displayed. The metal layer is provided on the principal surface. The coat layer covers the metal layer and is in contact with the principal surface. The cover member faces the coat layer. The adhesive layer bonds the cover member to the coat layer and continuously covers the principal surface and at least a part of an outer edge of the coat layer.

Disclosure in each embodiment is merely an example. Arbitrary changes easily conceivable by a person of ordinary skill in the art without departing from the spirit of the invention are deservingly included in the scope of the present invention. In the drawings, a width, thickness, shape and the like of each element are often shown schematically in comparison with an actual state to clarify descriptions, but these are merely an example and do not limit interpretation of the invention. In the drawings, reference numbers may be omitted with respect to elements that are continuously arranged and equivalent or similar to each other. In the specification and the drawings, a constituent element that performs a function equivalent or similar to that of the constituent element already described with reference to the preceding drawing is often represented by the same reference number and the overlapping detailed description is omitted as appropriate.

In the first to third embodiments described below, a liquid crystal display device with a sensor is disclosed as an example of a display device. The liquid crystal display device can be applied to various devices such as a smartphone, a tablet, a cellular phone, a notebook computer, a game console, etc.

The display device is not limited to the liquid crystal display device and may be any flatpanel display device, for example, a selfluminous display device such as an organic electroluminescence display device, an electronic paper display device having an electrophoresis element, or the like.

First Embodiment

FIG. 1 is a perspective view schematically showing a structure of a liquid crystal display device of the present embodiment. As shown in FIG. 1, a liquid crystal display device DSP comprises an active-matrix liquid crystal display panel PNL, a driving IC chip IC1 which drives the liquid crystal display panel PNL, an electrostatic capacitance type sensor SE, a driving IC chip IC2 which drives the sensor SE, a backlight unit BL which illuminates the liquid crystal display panel PNL, a control module CM, flexible printed circuit boards FPC1, FPC2, FPC3, etc.

The sensor SE comprises sensing electrodes Rx formed on a display surface of the liquid crystal display panel PNL.

The driving IC chip IC1 is mounted on the liquid crystal display panel PNL. The flexible printed circuit board FPC1 connects the liquid crystal display panel PNL to the control module CM. The flexible printed circuit board FPC2 connects at least a part of elements of the sensor SE to the control module CM. The driving IC chip IC2 is mounted on the flexible printed circuit board FPC2. The flexible printed circuit board FPC3 connects the backlight unit BL to the control module CM.

The liquid crystal display panel PNL comprises a first substrate SUB1, a second substrate SUB2 located to face the first substrate SUB1 and a liquid crystal layer (liquid crystal layer LQ to be described later) sandwiched between the first substrate SUB1 and the second substrate SUB2.

The liquid crystal display panel PNL comprises a display area DA in which an image is displayed. In the example of FIG. 1, the sensing electrodes Rx are provided in the display area DA. For example, the sensing electrodes Rx are arranged in a first direction X and extend in a second direction Y intersecting the first direction X. For example, the first direction X and the second direction Y are orthogonal to each other.

The backlight unit BL is located on the side of the back surface of the first substrate SUB1. Such a backlight unit BL can take various forms. As an example, the backlight unit BL comprises a light guide facing the first substrate SUB1 and a light source such as light-emitting diodes (LEDs) arranged along the end of the light guide.

FIG. 2 is a cross-sectional view schematically showing a structural example of the liquid crystal display panel PNL and elements provided on a principal surface of the liquid crystal display panel PNL. The liquid crystal display panel PNL comprises a unit pixel (unit pixel area) PX. The unit pixel PX is a minimum unit constituting a color image displayed in the display area DA.

FIG. 2 shows an example of a structure of the unit pixel PX in which subpixels (subpixel areas) PXR, PXG and PXB corresponding to red, green and blue, respectively, are arranged in the first direction X. Such unit pixels PX are arrayed in a matrix in the display area DA. The layout of the subpixels PXR, PXG and PXB constituting each unit pixel PX is not limited to the example of FIG. 2, and the three subpixels PXR, PXG and PXB are not necessarily arranged in one direction. The unit pixel PX may include a subpixel of a color other than red, green and blue such as a subpixel corresponding to white.

As described above, the liquid crystal display panel PNL comprises the first substrate SUB1, the second substrate SUB2 located to face the first substrate SUB1, and the liquid crystal layer LQ held between the first substrate SUB1 and the second substrate SUB2.

The first substrate SUB1 comprises a first insulating substrate 10 having a light transmitting property such as a glass substrate or a resin substrate. The first insulating substrate 10 has a first principal surface 10A facing the second substrate SUB2 and a second principal surface 10B on the opposite side of the first principal surface 10A.

In addition, the first substrate SUB1 comprises a first insulating layer 11 covering the first principal surface 10A of the first insulating substrate 10, common electrodes CE arranged on the first insulating layer 11, and a second insulating layer 12 covering the common electrodes CE.

The first substrate SUB1 further comprises pixel electrodes PER, PEG and PEB corresponding to the subpixels PXR, PXG and PXB, respectively, and a first alignment film AL1 covering the pixel electrodes PER, PEG, PEB and the second insulating layer 12 and in contact with the liquid crystal layer LQ. The common electrodes CE face the pixel electrodes PER, PEG and PEB through the second insulating layer 12. In the example of FIG. 2, each of the pixel electrodes PER, PEG and PEB has a slit PSL.

For example, the common electrodes CE and the pixel electrodes PER, PEG and PEB are formed of a transparent conductive material such as indium tin oxide (ITO), indium zinc oxide (IZO) or the like.

The second substrate SUB2 comprises a second insulating substrate 20 having a light transmitting property such as a glass substrate or a resin substrate. The second insulating substrate 20 has a first principal surface 20A facing the first substrate SUB1 and a second principal surface 20B on the opposite side of the first principal surface 20A.

The second substrate SUB2 further comprises color filters CFR, CFG and CFB and a black matrix 21 provided on the first principal surface 20A (i.e., the surface on the side of the first substrate SUB1) of the second insulating substrate 20.

The color filter CFR is formed of, for example, a resin material colored red, and is located in the red subpixel PXR. The color filter CFG is formed of, for example, a resin material colored green, and is located in the green subpixel PXG. The color filter CFB is formed of, for example, a resin material colored blue, and is located in the blue subpixel PXB.

The black matrix 21 makes a division into the subpixels PXR, PXG and PXB. The boundaries between the color filters CFR, CFG and CFB face the black matrix 21.

The second substrate SUB2 further comprises a third insulating layer 22 covering the color filters CFR, CFG and CFB and the black matrix 21, and a second alignment film AL2 covering the third insulating layer 22 and in contact with the liquid crystal layer LQ.

In the example of FIG. 2, a first polarizer PL1 and a first adhesive layer GL1 are provided on the second principal surface 10B of the first insulating substrate 10. The first polarizer PL1 is bonded to the second principal surface 10B by the first adhesive layer GL1.

In the example of FIG. 2, the sensing electrodes Rx, an overcoat layer OC, a second polarizer PL2 facing the display area DA and a second adhesive layer GL2 are provided on the second principal surface 20B of the second insulating substrate 20. A retardation film may be provided between the first polarizer PL1 and the first insulating substrate 10, and between the second polarizer PL2 and the second insulating substrate 20.

The overcoat layer OC covers the sensing electrodes Rx. As a material of the overcoat layer OC, for example, polyimide, acrylic resin, epoxy resin or the like may be used.

The second polarizer PL2 comprises a polarization element which polarizes light from the display area DA, and is bonded to the overcoat layer OC by the second adhesive layer GL2. A first polarizing axis of the first polarizer PL1 and a second polarizing axis of the second polarizer PL2 are in a positional relationship of crossed Nicols. In other words, these polarizing axes (absorption axes) are orthogonal to each other on the X-Y plane. The second polarizer PL2 is an example of a cover member.

For example, the second polarizer PL2 has a laminated structure obtained by sandwiching the polarization element between a pair of support layers. The support layers are formed of, for example, triacetylcellulose (TAC). The polarization element is formed of, for example, polyvinyl alcohol (PVA). The same laminated structure as the second polarizer PL2 may be applied to the first polarizer PL1.

As a material of the second adhesive layer GL2, for example, an acrylic polymer or a methacrylic polymer may be used.

As an example, the structure shown in FIG. 2 can be applied to the liquid crystal display panel PNL in a mode using a lateral electric field substantially parallel to the substrate principal surface for switching liquid crystal molecules. However, the mode of the liquid crystal display panel PNL is not limited to the mode using the lateral electric field, and may be a mode using a longitudinal electric field parallel to the normal direction of the substrate principal surface for switching liquid crystal molecules, such as a twisted nematic (TN) mode or a vertical aligned (VA) mode.

The sensor SE is constituted by, for example, the sensing electrodes Rx and the common electrodes CE. In this case, the common electrodes CE function as driving electrodes for sensing in addition to functioning as electrodes for display. The structure and operation of such a sensor SE is hereinafter described.

Figure 3:
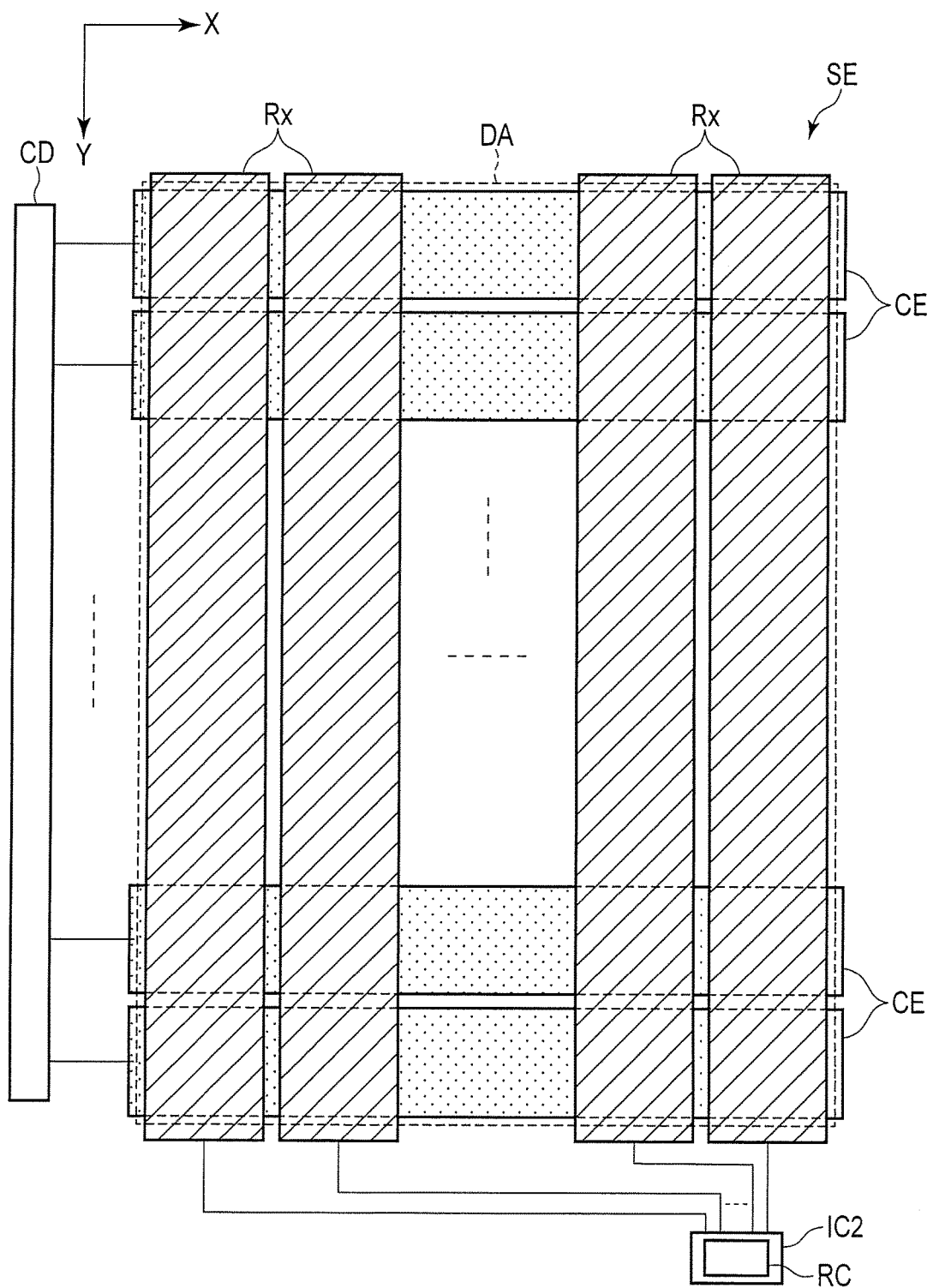
FIG. 3 is an illustration of a sensor comprised in the display device.

FIG. 3 is an illustration of the sensor SE and schematically shows a planar positional relationship between the sensing electrodes Rx and the common electrodes CE. In the example of FIG. 3, the display area DA has a rectangular shape having the short sides extending in the first direction X and the long sides extending in the second direction Y. In the display area DA, the sensing electrodes Rx extend in the second direction Y in the form of belts and are arranged in the first direction X at certain pitches. In contrast, the common electrodes CE extend in the first direction X in the form of belts and arranged in the second direction Y at certain pitches.

The sensing electrodes Rx are electrically connected to a sensing circuit RC. The sensing circuit RC is built in, for example, the driving IC chip IC2. The sensing circuit RC may be provided in the control module CM.

The common electrodes CE are electrically connected to a common electrode driving circuit CD. For example, the common electrode driving circuit CD is formed on the first substrate SUB1 outside the display area DA.

The common electrode driving circuit CD selectively supplies the common electrodes CE with a common driving signal (first driving signal) for driving subpixels included in each unit pixel PX and a sensor driving signal (second driving signal) for driving the sensor SE. For example, the common electrode driving circuit CD sequentially supplies each common electrode CE with the common driving signal in a display period of displaying an image in the display area DA, and sequentially supplies each common electrode CE with the sensor driving signal in a sensing period of detecting an object touching or approaching the display area DA.

A first capacitance occurs between common electrodes CE supplied with the sensor driving signal and the sensing electrodes Rx. When a conductive object is close to the display area DA, a second capacitance occurs between the object and the sensing electrodes Rx. The first capacitance between sensing electrodes Rx close to the object and the common electrodes CE is varied by the influence of the second capacitance. Therefore, a sensor output signal obtained from the sensing electrodes Rx close to the object has a different value from a sensor output signal obtained from the other sensing electrodes Rx.

The sensing circuit RC detects the object touched or approached the display area DA based on such variation of the sensor output signal. The sensing circuit RC can also detect a position in the display area DA that the object has touched or approached.

Next, the elements provided on the second principal surface 20B of the second insulating substrate 20 are described in detail. The second principal surface 20B corresponds to a principal surface of the liquid crystal display panel PNL including the display area DA.

Figure 4:
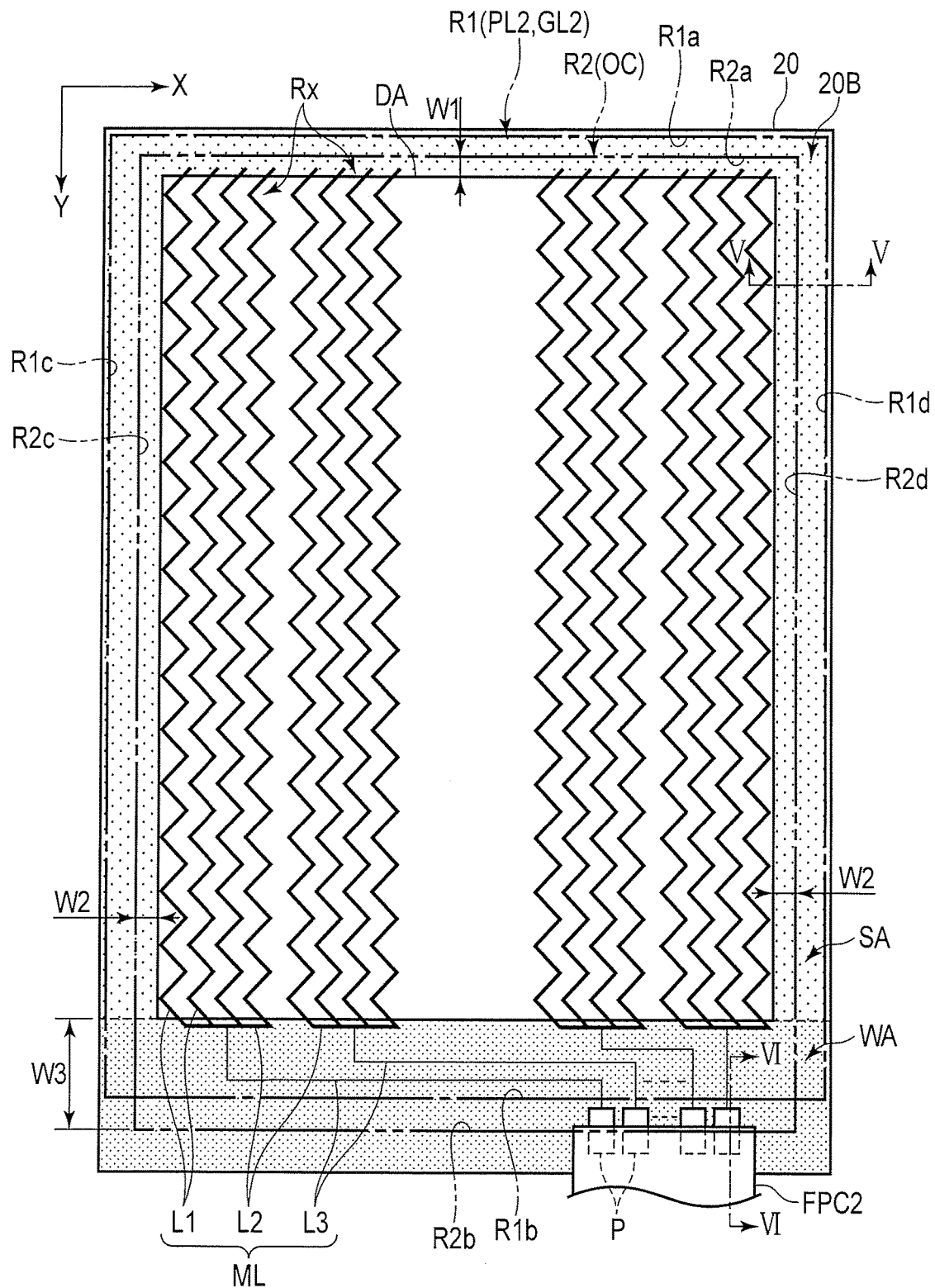
FIG. 4 is a plan view schematically showing an example of the elements provided on the principal surface of the display panel.

FIG. 4 is a plan view schematically showing an example of the elements provided on the second principal surface 20B of the second insulating substrate 20. In the example of FIG. 4, each sensing electrode Rx comprises sensing lines L1 and a connection line L2 connecting the sensing lines L1. In the display area DA, the sensing lines L1 connected by the connection line L2 meander in the second direction Y like waveforms (more specifically, triangle waveforms) and are arranged in the first direction X at certain pitches.

The structure of the sensing electrodes Rx is not limited to the example shown in FIG. 4. For example, the sensing electrodes Rx may have a structure in which metal lines intersect in a net-like fashion. An electrically-floating dummy electrode may be provided between adjacent sensing electrodes Rx. For example, such a dummy electrode may be formed in a shape similar to the sensing electrode Rx by a sensing line broken at arbitrary positions.

The second principal surface 20B has a surrounding area SA and a wiring area WA which are located outside the display area DA. The surrounding area SA and the wiring area WA are areas not contributing display, and constitute a frame area of the display area DA. In the example of FIG. 4, the surrounding area SA corresponds to an area between the edge of the second principal surface 20B and one of the short sides (i.e., the short side at the top of the drawing) and the two long sides of the display area DA, and the wiring area WA corresponds to an area between the edge of the second principal surface 20B and the other of the short sides (i.e., the short side at the bottom of the drawing) of the display area DA. It should be noted that FIG. 4 shows the surrounding area SA and the wiring area WA in a width greater than an actual state to simplify descriptions.

Pads P and leads L3 electrically connecting the sensing electrodes Rx to the pads P, respectively, are provided in the wiring area WA. In the example of FIG. 4, each lead L3 connects a corresponding pad P to an end of a corresponding sensing electrode Rx on the side of the pad P (i.e., the connection line L2). In the example of FIG. 4, the pads P are arranged in the first direction X at certain intervals. Each pad P is electrically connected to the flexible printed circuit board FPC2.

For example, the sensing lines L1, the connection lines L2 and the leads L3 are integrally formed of the same metal material in the same manufacturing process. As the metal material, for example, aluminum (Al), molybdenum (Mo), alloy including either of them or the like may be used. In the present embodiment, the sensing lines L1, the connection lines L2 and the leads L3 are an example of a metal layer ML.

For example, each of the second polarizer PL2, the second adhesive layer GL2 and the overcoat layer OC has a rectangular shape covering the display area DA. For example, the second polarizer PL2 and the second adhesive layer GL2 have the same shape and are provided on the second principal surface 20B with their outer edges aligned. In FIG. 4, an outer edge R1 of the second polarizer PL2 and the second adhesive layer GL2 is indicated by a one-dot chain line, and an outer edge R2 of the overcoat layer OC is indicated by a two-dot chain line. The outer edge of the second polarizer PL2 and the outer edge of the second adhesive layer GL2 need not precisely correspond to each other. For example, the outer edge of the second adhesive layer GL2 may be located slightly outside the outer edge of the second polarizer PL2, or the outer edge of the second polarizer PL2 may be located slightly outside the outer edge of the second adhesive layer GL2.

The outer edge R1 includes sides R1a and R1b corresponding to the short sides of the second polarizer PL2 and the second adhesive layer GL2, and sides R1c and R1d corresponding to the long sides of the second polarizer PL2 and the second adhesive layer GL2. The side R1a extends in the first direction X in the surrounding area SA. The side R1b extends in the first direction X in the wiring area WA. Each of the sides R1c and R1d connects the sides R1a and R1b and extends in the second direction Y in the surrounding area SA and the wiring area WA.

The outer edge R2 of the overcoat layer OC includes sides R2a and R2b corresponding to the short sides of the overcoat layer OC, and sides R2c and R2d corresponding to the long sides of the overcoat layer OC. The side R2a extends in the first direction X in the surrounding area SA. The side R2b extends in the first direction X in the wiring area WA. Each of the sides R2c and R2d connects the sides R2a and R2b and extends in the second direction Y in the surrounding area SA and the wiring area WA.

In the example of FIG. 4, the side R1a is located outside the side R2a (i.e., on the far side of the display area DA), the side R1c is located outside the side R2c, and the side R1d is located outside the side R2d. The side R1b is located inside the side R2b (i.e., on the near side of the display area DA).

In other words, the side R2a is located between the side R1a and the display area DA, the side R2c is located between the side R1c and the display area DA, and the side R2d is located between the side R1d and the display area DA. The side R1b is located between the side R2b and the display area DA.

In the example of FIG. 4, the overcoat layer OC covers the sensing lines L1 and the connection lines L2 constituting the sensing electrodes Rx and the leads L3. The overcoat layer OC also covers a part of each pad P. That is, the pads P are arranged along a side (side R2b) of the overcoat layer OC on the second principal surface 20B.

In the surrounding area SA, a width of the overcoat layer OC between the side R2a and the display area DA is W1, and a width of the overcoat layer OC between the side R2c and the display area DA and a width of the overcoat layer OC between the side R2d and the display area DA are W2. In the wiring area WA, a width of the overcoat layer OC between the side R2b and the display area DA is W3 which is greater than W1 and W2.

FIG. 5 is a view schematically showing an example of a cross-section of the display area DA and the surrounding area SA seen along V-V in FIG. 4. In the display area DA, a metal layer ML (sensing line L1) is provided on the second principal surface 20B of the second insulating substrate 20, and the overcoat layer OC covers the metal layer ML. The overcoat layer OC is in contact with the second principal surface 20B in the surrounding area SA.

In the example of FIG. 5, the outer edge R1 (side R1d) of the second polarizer PL2 and the second adhesive layer GL2 is aligned with the edge of the second insulating substrate 20. The second adhesive layer GL2 fills a space between the second polarizer PL2 and the overcoat layer OC and the second insulating substrate 20, covers the overcoat layer OC, and in contact with the second principal surface 20B. That is, the second adhesive layer GL2 adheres to the second polarizer PL2, continuously covers the outer edge R2 (side R2d) of the overcoat layer OC and the second principal surface 20B, and thereby covers a boundary BD between the overcoat layer OC and the second principal surface 20B.

A first adhesive force between the second adhesive layer GL2 and the second principal surface 20B is greater than a second adhesive force between the overcoat layer OC and the second principal surface 20B (first adhesive force>second adhesive force). In addition, a third adhesive force between the second polarizer PL2 and the second principal surface 20B bonded by the second adhesive layer GL2 is greater than a fourth adhesive force between the second polarizer PL2 and the overcoat layer OC bonded by the second adhesive layer GL2 (third adhesive force>fourth adhesive force). Specific values of the first to fourth adhesive forces that satisfy such a condition are defined depending on, for example, materials of the second insulating substrate 20, the overcoat layer OC and the second adhesive layer GL2.

In the surrounding area SA, a cross-section including the sides R1a and R2a and a cross-section including the sides R1c and R2c each have the approximately-same structure as the cross-section shown in FIG. 5.

FIG. 6 is a view schematically showing an example of a cross-section of the wiring area WA seen along VI-VI in FIG. 4. In the wiring area WA, a metal layer ML (lead L3) is connected to a pad P. The metal layer ML is covered with the overcoat layer OC.

The flexible printed circuit board FPC2 is connected to the pad P by compression bonding using, for example, a thermoset conductive adhesive (anisotropic conductive film). In the process of the compression bonding, since the periphery of the pad P is exposed to high temperatures, the second polarizer PL2 may be damaged by heat. The second polarizer PL2 can be protected against the heat in the process of compression bonding by locating the second polarizer PL2 distant from the flexible printed circuit board FPC2 as shown in FIGS. 4 and 6. In addition, the outer edge R2 (side R2b) of the overcoat layer OC is located on the pad P. That is, the overcoat layer OC covers a part of the pad P and covers an entire lead L3 connected to the pad P. Exposure of the metal layer ML (lead L3) can thereby be avoided in the wiring area WA. The part of the pad P not covered with the overcoat layer OC is covered with the conductive adhesive used for bonding the flexible printed circuit board FPC2. Exposure of the pad P can thereby be avoided. The pad P may be formed of an oxide conductive material such as ITO, which is more corrosion-resistant than a metal material.

As described above, in the present embodiment, the sensing electrodes Rx (the sensing lines L1 and the connection lines L2) and the leads L3 are formed of the low-resistance metal material. Therefore, the resistance of the sensing electrodes Rx and the leads L3 can be lowered in comparison with a case of forming the sensing electrodes Rx and the leads L3 of a high-resistance conductive material such as ITO. By structuring the sensor SE using the low-resistance sensing electrodes Rx and leads L3, a time constant of the sensor SE can be significantly improved.

All the elements included in the metal layer ML (i.e., the sensing lines L1, the connection lines L2 and the leads L3) are not necessarily formed of the metal material, and a part of the elements may be formed of a transparent conductive material such as ITO. Even in this case, the time constant of the sensor SE can be improved in comparison with a case of forming all the elements included in the metal layer ML of a high-resistance conductive material.

Since the hardness of the metal material is lower than that of, for example, ITO, the metal material is prone to damage and corrode (oxidize). The overcoat layer OC performs a function of protecting the metal layer ML against such damage and corrosion.

If the adhesion between the overcoat layer OC and the second principal surface 20B of the second insulating substrate 20 is poor, water may reach the metal layer ML from a boundary between the overcoat layer OC and the second principal surface 20B (for example, the boundary BD shown in FIG. 5). In the example shown in FIG. 4, etc., a part of the sensing lines L1 of the metal layer ML is proximate to the outer edge R2 of the overcoat layer OC in the surrounding area SA. Accordingly, if water reaches the metal layer ML as described above, the sensing lines L1 are likely to be corroded by the water. In this regard, the boundary is covered with the second adhesive layer GL2 in the present embodiment, which can prevent water from reaching the metal layer ML from the boundary and prevent the metal layer ML such as sensing lines L1 from corroding by the water.

In the wiring area WA in which the pads P are provided, the outer edge of the second polarizer PL2 and the second adhesive layer GL2 is located closer to the display area DA than the outer edge of the overcoat layer OC. If width W3 of the overcoat layer OC in the wiring area WA is greater than widths W1 and W2 of the overcoat layer OC in the surrounding area SA as shown in FIG. 4, water is less prone to penetrate into the boundary between the overcoat layer OC and the second principal surface 20B in the wiring area WA than in the surrounding area SA. Therefore, corrosion of the metal layer ML such as leads L3 can be avoided even in the wiring area WA.

Since the first adhesive force between the second adhesive layer GL2 and the second principal surface 20B is greater than the second adhesive force between the overcoat layer OC and the second principal surface 20B, the second adhesive layer GL2 and the second principal surface 20B are bonded more strongly than the overcoat layer OC and the second principal surface 20B. By using such a second adhesive layer GL2, penetration of water into the boundary between the overcoat layer OC and the second principal surface 20B can be avoided more effectively. In addition, considering that the third adhesive force between the second polarizer PL2 and the second principal surface 20B bonded by the second adhesive layer GL2 is greater than the fourth adhesive force between the second polarizer PL2 and the overcoat layer OC bonded by the second adhesive layer GL2, the second polarizer PL2 is strongly bonded to the second principal surface 20B in the structure of the present embodiment in comparison with a case where the second adhesive layer GL2 is not in contact with the second principal surface 20B. Therefore, peel strength of the second polarizer PL2 and the second insulating substrate 20 (or the liquid crystal display panel PNL) can be improved.

The second polarizer PL2 may be conductive. For example, the second polarizer PL2 becomes conductive by providing a transparent antistatic layer (conductive layer) formed of, for example, ITO, on the second polarizer PL2. If the second polarizer PL2 is conductive, the second polarizer PL2 functions as a shield, which inhibits static electricity or ions from building up near the principal surface, the outer edge R2, etc., of the overcoat layer OC. As a result, a display error and a sensing error of the sensor SE caused by such static electricity or ions can be avoided.

The second adhesive layer GL2 may also be conductive. As such a second adhesive layer GL2, for example, an adhesive obtained by adding conductive filler to binder resin may be used. If the second adhesive layer GL2 is conductive, the same effect as the antistatic layer described above can be achieved.

The inventor has carried out experiment I to test the corrosion prevention effect of the structure of the present embodiment on the metal layer ML and experiment II to test the peel strength increase effect of the structure of the present embodiment. The experiments are described with reference to FIG. 7 to FIG. 12.

Experiment I

FIG. 7 shows a schematic structure of a first sample SP11 used in experiment I. The first sample SP11 comprises a second insulating substrate 20, sensing electrodes Rx formed on a second principal surface 20B of the second insulating substrate 20, an overcoat layer OC covering the sensing electrodes Rx, a second polarizer PL2 located above the overcoat layer OC, and a second adhesive layer GL2 located between the second polarizer PL2 and the overcoat layer OC.

Similarly to the example of FIG. 4, each sensing electrode Rx comprises sensing lines L1 and connection lines L2. In experiment I, however, both ends of the sensing lines L1 are connected by the connection lines L2, respectively. One end of each lead L3 is connected to a corresponding connection line L2, and the other end of the lead L3 is connected to a corresponding pad P.

The overcoat layer OC covers the sensing electrodes Rx, the leads L3 and a part of each pad P. An entire outer edge R1 of the second polarizer PL2 and the second adhesive layer GL2 is located outside an outer edge R2 of the overcoat layer OC (i.e., on the far side of the center of the second principal surface 20B).

Figure 8:
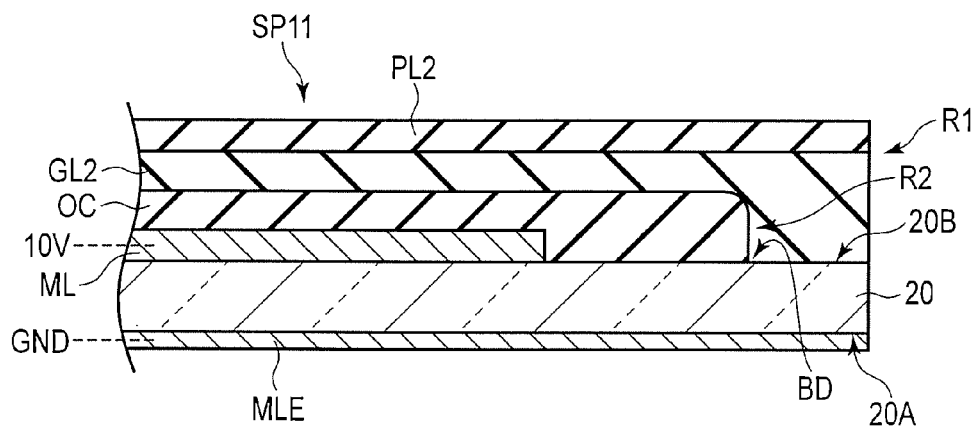
FIG. 8 is a view schematically showing a part of a cross-section of the first sample used in experiment I.

FIG. 8 is a view schematically showing a part of a cross-section of the first sample SP11. The cross-section shown in FIG. 8 is substantially the same as the cross-section shown in FIG. 5. That is, a boundary BD between the overcoat layer OC and the second principal surface 20B is covered with the second adhesive layer GL2. In the first sample SP11, a metal layer MLE is provided on a first principal surface 20A of the second insulating substrate 20. As shown in FIG. 7, the metal layer MLE is formed on the entire first principal surface 20A.

Figure 9:
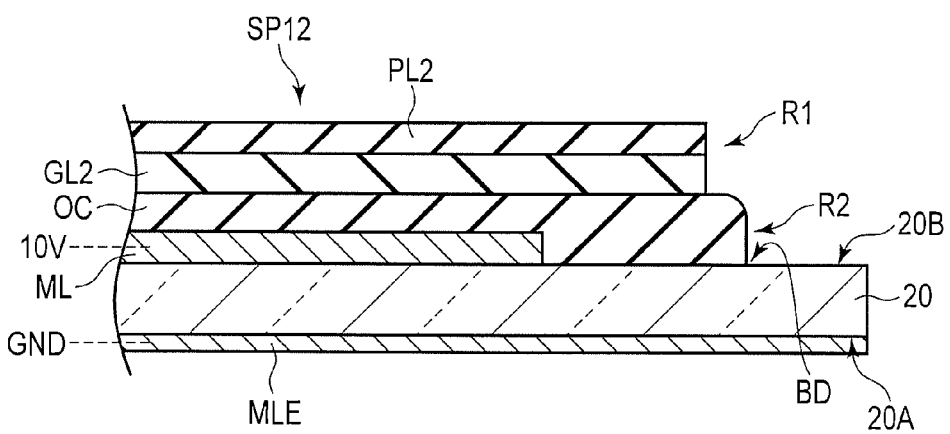
FIG. 9 is a view schematically showing a part of a cross-section of a second sample used in experiment I.

The inventor has prepared a second sample SP12 used in experiment I together with the first sample SP11. FIG. 9 is a view schematically showing a part of a cross-section of the second sample SP12. The second sample SP12 is different from the sample SP11 in that the entire outer edge R1 of the second polarizer PL2 and the second adhesive layer GL2 is located inside the outer edge R2 of the overcoat layer OC (i.e., on the near side of the center of the second principal surface 20B). That is, the boundary BD is not covered with the second adhesive layer GL2 in the second sample SP12.

In both the first sample SP11 and the second sample SP12, the inventor has connected the metal layer MLE to ground (GND), continuously applied a voltage of 10V to the metal layer ML through the pads P, and measured a resistance between each pair of pads P. The experiment has been carried out at a temperature of 70° C. and a humidity of 90%. At the start of the experiment, the resistance between each pair of pads P in the first sample SP11 is substantially equal to the resistance between each pair of pads P in the second sample SP12.

FIG. 10 is a graph showing a measurement result of the resistances. The horizontal axis represents an input time (h) of the voltage to the metal layer ML. The vertical axis represents a rate of change of the resistances by using the first resistance of each pair of pads P as 1. A plot of the resistance of the first sample SP11 corresponds to an average of the resistances between the respective pairs of pads P of the first sample SP11 at specified times. A plot of the resistance of the second sample SP12 corresponds to an average of the resistances between the respective pairs of pads P of the second sample SP12 at the specified times.

The resistance of the second sample SP12 rises with time. At the time when two thousand hours have passed, the resistance is 1.08 times greater than at the start of the experiment. In contrast, the resistance of the first sample SP11 almost never changes with time.

The result of experiment has shown that the beneficial effect of preventing corrosion of the metal layer ML can be achieved by covering the boundary between the overcoat layer OC and the second principal surface 20B with the second adhesive layer GL2.

Experiment II

FIG. 11 is an illustration of a schematic structure of a first sample SP21 used in experiment II and an experimental method. The first sample SP21 comprises a second insulating substrate 20. The first sample SP21 further comprises the elements described with reference to FIG. 4 to FIG. 6, for example, the metal layer ML, the overcoat layer OC, the second polarizer PL2, the second adhesive layer GL2 and the like, on a second principal surface 20B of the second insulating substrate 20. These elements are located similarly to the example shown in FIG. 4 to FIG. 6. That is, in the surrounding area SA, the second adhesive layer GL2 covers the boundary BD between the overcoat layer OC and the second principal surface 20B and is in contact with the second principal surface 20B.

The inventor has prepared a second sample SP22 used in experiment II together with the first sample SP21. The second sample SP22 is different from the sample SP21 in that the entire outer edge R1 of the second polarizer PL2 and the second adhesive layer GL2 is located inside the outer edge R2 of the overcoat layer OC.

In experiment II, the first principal surface 20A of the second insulating substrate 20 is fixed to a stage, a jig T is bonded to the second polarizer PL2 of each of the first sample SP21 and the second sample SP22 by an adhesive G and a tensile force TF is applied to the jig T in the normal direction of the second principal surface 20B, as shown in FIG. 11. The tensile force TF is gradually increased from zero until the second polarizer PL2 is peeled from the second insulating substrate 20, and the tensile force TF at the instant of peeling is recorded. Such experiment II has been carried out on first samples SP21 and second samples SP22.

FIG. 12 is a graph showing a measurement result of the tensile force TF at the instant of peeling with respect to the first samples SP21 and the second samples SP22. The vertical axis represents peel strength obtained by converting the tensile force TF at the instant of peeling into an arbitrary unit. On the whole, the peel strength of the first samples SP21 is higher than that of the second samples SP22 by about 30%.

The result of experiment has shown that the beneficial effect of improving the peel strength between the second polarizer PL2 and the second insulating substrate 20 can be achieved by bringing the second adhesive layer GL2 into contact with the second principal surface 20B.

Second Embodiment

The second embodiment is described. In the description below, constituent elements, effects and the like not particularly mentioned are the same as those of the first embodiment.

FIG. 13 is a plan view schematically showing an example of elements provided on a second principal surface 20B of a second insulating substrate 20 (i.e., a principal surface of the liquid crystal display panel PNL) in the present embodiment. FIG. 13 shows common electrodes CE as driving electrodes constituting the sensor SE together with the sensing electrodes Rx.

In the example of FIG. 13, the display area DA has a rectangular shape having the short sides extending in the first direction X and the long sides extending in the second direction Y. In the display area DA, the common electrodes CE extend in the second direction Y in the form of belts and arranged in the first direction X at certain pitches.

In the display area DA, the sensing electrodes Rx extend in the first direction X and arranged in the second direction Y at certain pitches. Each sensing electrode Rx comprises sensing lines L1 and a connection line L2 connecting the sensing lines L1. The sensing lines L1 connected by the connection line L2 meander in the first direction X like waveforms (more specifically, triangle waveforms) and arranged in the second direction Y at certain pitches in the display area DA. The structure of the sensing electrodes Rx is not limited to the example shown in FIG. 13 and may be a structure in which metal lines intersect in a net-like fashion.

In the example of FIG. 13, odd-numbered sensing electrodes Rx from the top of the drawing each comprise a connection line L2 on the left side (side of the sides R1c and R2c) of the display area DA, and leads L3 connecting the connection lines L2 to pads P extend along the left side of the display area DA in the surrounding area SA. Even-numbered sensing electrodes Rx from the top of the drawing each comprise a connection line L2 on the right side (side of the sides R1d and R2d) of the display area DA, and leads L3 connecting the connection lines L2 to pads P extend along the right side of the display area DA in the surrounding area SA. As described above, in the present embodiment, each lead L3 connects a corresponding pad P to one of ends of a corresponding sensing electrode Rx in the first direction X (i.e., the connection line L2).

In such a structure, a part of the leads L3 of the metal layer ML is located outermost (i.e., on the far side of the center of the second principal surface 20B) in the surrounding area SA on the right and left of the display area DA. The sides R2c and R2d of the outer edge R2 of the overcoat layer OC are located outside the leads L3, and the sides R1c and R1d of the outer edge R1 of the second polarizer PL2 and the second adhesive layer GL2 are located outside the sides R2c and R2d.

In the surrounding area SA, a boundary between the overcoat layer OC and the second principal surface 20B is covered with the second adhesive layer GL2, similarly to the boundary BD shown in FIG. 4. The second adhesive layer GL2 continuously covers the overcoat layer OC and the second principal surface 20B, and thereby covers the boundary BD between the overcoat layer OC and the second principal surface 20B.

In the surrounding area SA on the right and left of the display area DA, when water penetrates into the boundary between the overcoat layer OC and the second principal surface 20B, the leads L3 proximate to the boundary are likely to corrode. In this regard, the boundary is covered with the second adhesive layer GL2 in the present embodiment, which can prevent water from reaching the metal layer ML from the boundary and prevent the metal layer ML such as leads L3 from corroding by the water.

The same effect as the first embodiment can be achieved by the present embodiment.

Third Embodiment

The third embodiment is described. In the description below, constituent elements, effects and the like not particularly mentioned are the same as those of the first embodiment.

FIG. 14 is a plan view schematically showing an example of elements provided on a second principal surface 20B of a second insulating substrate 20 in the present embodiment. In the example of FIG. 14, a sensor SE comprises sensing electrodes Rx arranged on the second principal surface 20B, and driving electrodes Tx which supply the sensing electrodes Rx with a sensor driving signal. Since the driving electrodes Tx are provided, common electrodes CE need not function as driving electrodes for sensing. Therefore, only a common driving signal is supplied to the common electrodes CE. As a result, image display and object sensing on the liquid crystal display panel PNL can be separately and independently performed. In this case, the display period and the sensing period described in the first embodiment need not be provided by time-sharing.

The sensing electrodes Rx are arranged in the first direction X and the second direction Y in the display area DA. The driving electrodes Tx are arranged in the first direction X and the second direction Y with gaps between the sensing electrodes Rx and the driving electrodes Tx in the display area DA. Each of the sensing electrodes Rx and the driving electrodes Tx has a rhomboid shape whose diagonal lines extend in the first direction X and the second direction Y, respectively. The sensing electrodes Rx and the driving electrodes Tx are formed on the second principal surface 20B by using a transparent conductive material such as ITO.

Sensing electrodes Rx adjacent to each other in the first direction X are electrically connected to each other by a first connection line La. Driving electrodes Tx adjacent to each other in the second direction Y are electrically connected to each other by a second connection line Lb.

In the example of FIG. 14, of sensing electrodes Rx arranged in the second direction Y on the left side (side of the sides R1c and R2c) of the display area DA, odd-numbered sensing electrodes Rx from the top of the drawing are connected to the leads L3. These leads L3 extend in the second direction Y in the surrounding area SA on the left side of the display area DA and are connected to the pads P in the wiring area WA.

Of sensing electrodes Rx arranged in the second direction Y on the right side (side of the sides R1d and R2d) of the display area DA, even-numbered sensing electrodes Rx from the top of the drawing are connected to the leads L3. These leads L3 extend in the second direction Y in the surrounding area SA on the right side of the display area DA and are connected to the pads P in the wiring area WA.

The leads L3 are formed of a metal material such as aluminum (Al), molybdenum (Mo), alloy including either of them or the like. Such leads L3 are an example of the metal layer ML. By forming the leads L3 of the metal material, the resistance of the lead L3 can be lowered in comparison with a case of forming the leads L3 of a transparent conductive material such as ITO. Therefore, a time constant of the sensor SE can be improved.

Leads L3 are connected to driving electrodes Tx arranged in the first direction X near the wiring area WA. These leads L3 are connected to pads P in the wiring area WA.

A sensor driving signal is supplied to the driving electrodes Tx from the flexible printed circuit board FPC2 connected to the pads P. A sensing circuit RC acquires a sensor output signal from the sensing electrodes Rx in synchronization with the supply of the sensor driving signal, and detects an object touching or approaching the display area DA based on the sensor output signal. The sensing circuit RC can also detect a position that the object has touched or approached.

Figure 15:
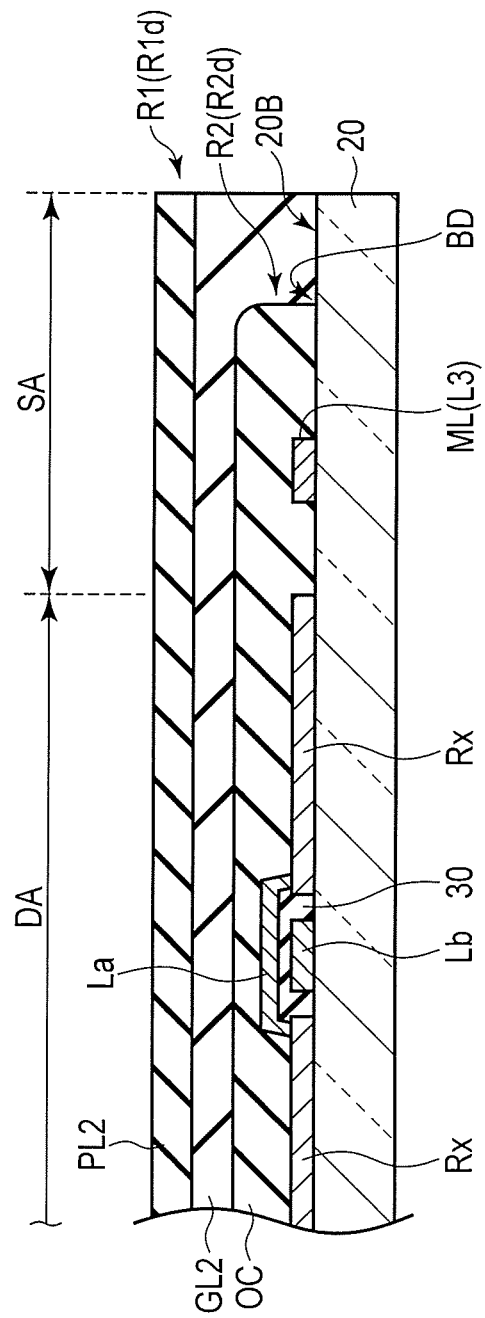
FIG. 15 is a view schematically showing an example of a cross-section seen along XV-XV in FIG. 4.

FIG. 15 is a view schematically showing an example of a cross-section of the display area DA and the surrounding area SA seen along XV-XV in FIG. 14. The second connection line Lb is provided between adjacent sensing electrodes Rx with intervals between the second connection line Lb and these sensing electrodes Rx. The second connection line Lb is covered with an insulating layer 30.

The first connection line La is provided on the insulating layer 30 and in contact with the sensing electrodes Rx. Such a first connection line La is also called a bridge. The first connection line La and the second connection line Lb are formed of, for example, a transparent conductive material such as ITO.

The metal layer ML (lead L3) is provided on the second principal surface 20B in the surrounding area SA. The metal layer ML is covered with the overcoat layer OC. The second adhesive layer GL2 continuously covers the overcoat layer OC and the second principal surface 20B. That is, the second adhesive layer GL2 covers a boundary BD between the overcoat layer OC and the second principal surface 20B.

In the above-described structure of the present embodiment, when water penetrates into the boundary between the overcoat layer OC and the second principal surface 20B (for example, the boundary BD shown in FIG. 15), the metal layer ML, namely the leads L3 may corrode. In this regard, the boundary is covered with the second adhesive layer GL2 in the present embodiment, which can prevent water from reaching the metal layer ML from the boundary and prevent the metal layer ML such as leads L3 from corroding by the water.

The same effect as the first embodiment can be achieved by the present embodiment.

In the above-described first to third embodiments, the outer edge R2 of the overcoat layer OC is covered with the second adhesive layer GL2 in the entire surrounding area SA. However, if at least a part of the outer edge R2 of the overcoat layer OC is covered with the second adhesive layer GL2, water can be prevented from reaching the metal layer ML located near the part of the outer edge R2 and the effect of improving the peel strength of the second polarizer PL2 can be achieved.

In the above-described first to third embodiments, the sensor SE of a sensing method using sensing electrodes and driving electrodes (often called a mutual capacitance sensing method) is disclosed. However, the sensor SE may be other types of sensors. For example, a sensing method using capacitance of sensing electrodes (often called a self capacitance sensing method) may be applied.

For example, when applying the self capacitance sensing method to the sensor of FIG. 14 comprising the sensing electrodes Rx and the driving electrodes Tx, the driving electrodes Tx can function as first electrodes (x-axis sensing electrode) for position detection in the first direction X, and the sensing electrodes Rx can function as second electrodes (y-axis sensing electrode) for position detection in the second direction Y. That is, in sensing, a driving signal is supplied to each first electrode, a sensing signal is read from each first electrode, a driving signal is supplied to each second electrode and a sensing signal is read from each second electrode. Since an object touching or approaching the display area DA influences capacitance of the first electrodes and the second electrodes, the position of the object in the first direction X and the second direction Y can be detected based on the sensing signals acquired from the first electrodes and the second electrodes.

In the example of FIG. 14, the driving electrodes Tx arranged in the second direction Y are electrically connected, and the sensing electrodes Rx arranged in the first direction X are electrically connected. However, in the case where the driving electrodes Tx and the sensing electrodes Rx function as the first electrodes and the second electrodes, respectively, these first electrodes and the second electrodes may be electrically independent and each of the first electrodes and the second electrodes may be connected to the pad P via the lead L3. In this case, each of the first electrodes and the second electrodes indicates a 2D position on the display area DA. Therefore, the position of the object can be directly detected based on the sensing signals acquired from each first electrode and each second electrode.

In the first to third embodiments, a cover member bonded to the overcoat layer OC and the second principal surface 20B by the adhesive layer is the second polarizer PL2. However, the cover member may be other members such as a cover glass located to face the second principal surface 20B and covering the display area DA.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display panel comprising a principal surface including a display area in which an image is displayed;
a metal layer provided on the principal surface;
a coat layer covering the metal layer and in contact with the principal surface;
a cover member facing the coat layer; and
an adhesive layer bonding the cover member to the coat layer and continuously covering the principal surface and at least a part of an outer edge of the coat layer,
wherein a first adhesive force between the adhesive layer and the principal surface is greater than a second adhesive force between the coat layer and the principal surface.

2. The display device of claim 1, wherein
the cover member comprises a polarization element which polarizes light from the display area.

3. The display device of claim 1, further comprising:
a sensing electrode provided on the principal surface to detect an object which has touched or approached the display area; and
a lead electrically connected to the sensing electrode and provided on the principal surface,
wherein at least one of the sensing electrode and the lead constitutes the metal layer.

4. The display device of claim 3, further comprising:
a pad provided on the principal surface along a side of the coat layer and connected to the lead,
wherein the adhesive layer continuously covers the principal surface and the outer edge of the coat layer excluding the side.

5. The display device of claim 4, further comprising:
a printed circuit board connected to the pad,
wherein the cover member and the printed circuit board are distant from each other.

6. The display device of claim 4, wherein
a width of the coat layer from the side in which the pad is provided to the display area is greater than a width of the coat layer from the outer edge excluding the side to the display area.

7. The display device of claim 4, further comprising:
sensing electrodes identical with the sensing electrode;
leads identical with the lead and connected to the sensing electrodes, respectively; and
pads identical with the pad and connected to the leads, respectively,
wherein the sensing electrodes are arranged in a first direction along the side of the coat layer in which the pads are provided and extend in a second direction intersecting the first direction in the display area, and
the leads connect the pads to ends of the sensing electrodes on a side of the pads, respectively.

8. The display device of claim 7, further comprising:
driving electrodes facing the sensing electrodes, respectively, and constituting a sensor for detecting an object touching or approaching the display area together with the sensing electrodes,
the driving electrodes extend in the first direction and are arranged in the second direction in the display area.

9. The display device of claim 8, further comprising:
a driving circuit which selectively supplies the driving electrodes with a first driving signal for driving pixels included in the display area and a second driving signal for driving the sensor.

10. The display device of claim 4, further comprising:
sensing electrodes identical with the sensing electrode;
leads identical with the lead and connected to the sensing electrodes, respectively; and
pads identical with the pad and connected to the leads, respectively,
wherein the sensing electrodes extend in a first direction along the side of the coat layer in which the pads are provided and are arranged in a second direction intersecting the first direction in the display area, and the leads connect the pads to ends of the sensing electrodes on any one of sides in the first direction, respectively.

11. The display device of claim 10, further comprising:
driving electrodes facing the sensing electrodes, respectively, and constituting a sensor for detecting an object touching or approaching the display area together with the sensing electrodes,
the driving electrodes extend in the second direction and are arranged in the first direction in the display area.

12. The display device of claim 11, further comprising:
a driving circuit which selectively supplies the driving electrodes with a first driving signal for driving pixels included in the display area and a second driving signal for driving the sensor.

13. The display device of claim 4, further comprising:
sensing electrodes identical with the sensing electrode and arranged on the principal surface of the display panel;
driving electrodes arranged on the principal surface at intervals with the sensing electrodes and constituting a sensor for detecting an object touching or approaching the display area together with the sensing electrodes;
leads identical with the lead and connected to the sensing electrodes and the driving electrodes, respectively; and
pads identical with the pad and connected to the leads, respectively.

14. A display device comprising:
a display panel comprising a principal surface including a display area in which an image is displayed;
a metal layer provided on the principal surface;
a coat layer covering the metal layer and in contact with the principal surface;
a cover member facing the coat layer; and
an adhesive layer bonding the cover member to the coat layer and continuously covering the principal surface and at least a part of an outer edge of the coat layer,
wherein a third adhesive force between the cover member and the principal surface bonded by the adhesive layer is greater than a fourth adhesive force between the cover member and the coat layer bonded by the adhesive layer.

15. The display device of claim 14, wherein
the cover member comprises a polarization element which polarizes light from the display area.

16. The display device of claim 14, further comprising:
a sensing electrode provided on the principal surface to detect an object which has touched or approached the display area; and
a lead electrically connected to the sensing electrode and provided on the principal surface,
wherein at least one of the sensing electrode and the lead constitutes the metal layer.

17. The display device of claim 16, further comprising:
a pad provided on the principal surface along a side of the coat layer and connected to the lead,
wherein the adhesive layer continuously covers the principal surface and the outer edge of the coat layer excluding the side.

18. The display device of claim 17, further comprising:
a printed circuit board connected to the pad,
wherein the cover member and the printed circuit board are distant from each other.

19. The display device of claim 17, wherein
a width of the coat layer from the side in which the pad is provided to the display area is greater than a width of the coat layer from the outer edge excluding the side to the display area.

20. The display device of claim 17, further comprising:
sensing electrodes identical with the sensing electrode;
leads identical with the lead and connected to the sensing electrodes, respectively; and
pads identical with the pad and connected to the leads, respectively,
wherein the sensing electrodes are arranged in a first direction along the side of the coat layer in which the pads are provided and extend in a second direction intersecting the first direction in the display area, and
wherein the leads connect the pads to ends of the sensing electrodes on a side of the pads, respectively.

* * * * *